(12) United States Patent
Lee et al.

(10) Patent No.: US 11,377,776 B2
(45) Date of Patent: Jul. 5, 2022

(54) LAUNDRY TREATING APPARATUS (71) Applicant: LG ELECTRONICS INC., Seoul (KR)

(72) Inventors: Kilryong Lee, Seoul (KR); Dongwon Kang, Seoul (KR); Donghyun Jin, Seoul (KR)

(73) Assignee: LG Electronics Inc., Seoul (KR)

( * ) Notice: Subject to any disclaimer, the term of this patent is extended or adjusted under 35 U.S.C. 154(b) by 170 days.

(21) Appl. No.: 16/778,624

(22) Filed: Jan. 31, 2020

(65) Prior Publication Data
US 2020/0248381 A1 Aug. 6, 2020

(30) Foreign Application Priority Data

Feb. 1, 2019 (KR) .......................... 10-2019-0013885

(51) Int. Cl.
| | | |
|---|---|---|
| *D06F 39/08* | (2006.01) | |
| *D06F 37/04* | (2006.01) | |
| *D06F 39/02* | (2006.01) | |
| *D06F 37/22* | (2006.01) | |

(52) U.S. Cl.
CPC ............ *D06F 39/083* (2013.01); *D06F 37/04* (2013.01); *D06F 39/02* (2013.01); *D06F 39/088* (2013.01); *D06F 37/22* (2013.01)

(58) Field of Classification Search
CPC .................................................. D06F 39/083
See application file for complete search history.

(56) References Cited

FOREIGN PATENT DOCUMENTS

| DE | 102009029523 | 3/2011 |
| EP | 3613893 | 2/2020 |
| JP | S59-232590 | 12/1984 |
| WO | WO2020040501 | 2/2020 |

OTHER PUBLICATIONS

Australian Office Action in Australian Application No. 2020200687, dated Aug. 14, 2020, 5 pages.
Extended European Search Report in European Appln. No. 20154777.5, dated May 26, 2020, 9 pages.

*Primary Examiner* — Jason Y Ko
(74) *Attorney, Agent, or Firm* — Fish & Richardson P.C.

(57) ABSTRACT

A laundry treating apparatus includes a cabinet with an inlet; a tub configured to receive water, having a tub inlet facing the inlet; a drum rotatably disposed inside the tub, configured to receive laundry, and having a drum inlet facing the inlet; a storage provided inside the cabinet and configured to store detergent; a discharge pipe configured to discharge the detergent to an outside of the storage, made of an elastic body; an insulating body connecting the inlet with the tub inlet; an inlet pipe made of an elastic body, passing through a circumferential surface of the insulating body; and a connector having one end inserted into the discharge pipe and the other end inserted into the inlet pipe to connect the discharge pipe with the inlet pipe, made of a material different from that of each of the discharge pipe and the inlet pipe.

19 Claims, 9 Drawing Sheets

LAUNDRY TREATING APPARATUS

CROSS-REFERENCE TO RELATED APPLICATIONS

This application claims the benefit of the Korean Patent Application No. 10-2019-0013885, filed on Feb. 1, 2019, which is hereby incorporated by reference as if fully set forth herein.

BACKGROUND OF THE INVENTION

Field of the Invention

The present disclosure relates to a laundry treating apparatus.

Discussion of the Related Art

A laundry treating apparatus includes an apparatus for washing laundry, an apparatus for drying laundry, and an apparatus for washing or drying laundry in accordance with selection of a user. A laundry treating apparatuses of the related art includes a cabinet, a tub provided inside the cabinet, storing water therein, a drum rotatably provided inside the tub, storing laundry, a detergent storage in which a detergent is stored, and a detergent path for guiding the detergent stored in the detergent storage to the tub.

It is general that one end of the detergent path provided in the laundry treating apparatus of the related art is fixed to the detergent storage, and the other end of the detergent path is fixed to a detergent supply hole provided in the tub. That is, one end of the detergent path is fixed to a discharge outlet of the detergent storage through a fastening member such as a clamp, and the other end of the detergent path is fixed to the detergent supply hole through the clamp. However, a problem occurs in that much time is required for assembly of the detergent path fixed to the tub and the detergent storage through the fastening member such as the clamp.

Meanwhile, the detergent path provided in the laundry treating apparatus of the related art is provided with a trap for disconnecting the tub from the detergent storage if water is stored therein. The trap provided in the detergent path serves to prevent bubbles inside the tub from being discharged to the detergent storage during washing. However, when a door opens an inlet provided in the cabinet, the water stored in the trap of the detergent path may be discharged to the tub if a pressure inside the tub is lowered. For this reason, a problem occurs in that a user doubts a damage of the detergent storage or the detergent path.

SUMMARY OF THE INVENTION

Accordingly, the present disclosure is directed to a laundry treating apparatus that substantially obviates one or more problems due to limitations and disadvantages of the related art.

An object of the present disclosure is to provide a laundry treating apparatus in which assembly of a detergent path for guiding a detergent to a tub is simple.

Another object of the present disclosure is to provide a laundry treating apparatus that easily prevents water leakage of a detergent path from occurring.

Still another object of the present disclosure is to provide a laundry treating apparatus that minimizes discharge of water stored in a trap formed in a detergent path to a tub due to a pressure change inside the tub.

Further still another object of the present disclosure is to provide a laundry treating apparatus that guides water, which moves from a trap to a tub due to a pressure change inside the tub, to an insulator for connecting a cabinet inlet with a tub inlet.

Additional advantages, objects, and features of the disclosure will be set forth in part in the description which follows and in part will become apparent to those having ordinary skill in the art upon examination of the following or may be learned from practice of the disclosure. The objectives and other advantages of the disclosure may be realized and attained by the structure particularly pointed out in the written description and claims hereof as well as the appended drawings.

To achieve these objects and other advantages and in accordance with the purpose of the disclosure, as embodied and broadly described herein, a laundry treating apparatus according to the present disclosure comprises an insulating body connecting an inlet provided in a cabinet with a tub inlet, an inlet pipe of an elastic material provided to pass through the insulating body, a discharge pipe of an elastic material discharging a detergent from a detergent storage, and a connector made of a material different from that of each of the inlet pipe and the discharge pipe. Through this connector, the laundry treating apparatus may enhance a coupling force between the inlet pipe and the discharge pipe and minimize the possibility of water leakage.

That is, the laundry treating apparatus according to the present disclosure comprises a cabinet provided with an inlet; a tub providing a space in which water is stored, having a tub inlet provided on a surface headed for a direction where the inlet is arranged; a drum rotatably provided inside the tub, providing a space in which laundry is stored, and having a drum inlet provided on a surface headed for a direction where the inlet is arranged; a storage provided inside the cabinet, providing a space in which a detergent is stored; a discharge pipe discharging the detergent to the outside of the storage, made of an elastic body; an insulating body connecting the inlet with the tub inlet; an inlet pipe made of an elastic body, passing through a circumferential surface of the insulating body; and a connector having one end inserted into the discharge pipe and the other end inserted into the inlet pipe to connect the discharge pipe with the inlet pipe, made of a material different from that of each of the discharge pipe and the inlet pipe.

The discharge pipe and the inlet pipe may be made of an elastic body such as rubber, and the connector may be made of a sintered body such as plastic.

Also, in the present disclosure, a laundry treating apparatus that attenuates the risk of water leakage due to thermal deformation generated in the middle of molding by allowing a surface which is longer among surfaces constituting the connector to be relatively thicker than any other surfaces.

That is, the connector may include a connector body of a cylindrical shape having one end inserted into the discharge pipe and the other end inserted into the inlet pipe, and a through hole provided to pass through the connector body, wherein the connector body may include a first surface and a second surface arranged to face each other, a third surface connecting one end of the first surface with one end of the second surface, and a fourth surface provided to connect the other end of the first surface with the other end of the second surface, facing the third surface, and two surfaces, which are the longest, among the four surfaces may be set to be thicker than two surfaces which are the shortest.

If the first surface and the second surface are set at the same length, the third surface and the fourth surface are set at the same length but are set to be shorter than the first surface, the first surface may be set to be thicker than the third surface.

In this case, a section in a thickness direction of the first surface may be provided in a convex shape toward a direction far away from a center of the through hole, and a section in a thickness direction of the second surface may be provided in a convex shape toward a direction far away from a center of the through hole.

Unlike the aforementioned description, if the first surface and the second surface are set at the same length, the third surface and the fourth surface are set at the same length but are set to be longer than the first surface, the third surface may be set to be thicker than the first surface.

In this case, a section in a thickness direction of the third surface may be provided in a convex shape toward a direction far away from a center of the through hole, and a section in a thickness direction of the fourth surface may be provided in a convex shape toward a direction far away from a center of the through hole.

The laundry treating apparatus may further comprise a first fastening portion including a first fastening protrusion provided on the third surface along a direction from the first surface to the second surface, a first protrusion first extension portion extended from the first fastening protrusion toward the discharge pipe, and a first protrusion second extension portion extended from the first fastening protrusion toward the inlet pipe; a second fastening portion including a second fastening protrusion provided on the fourth surface along a direction from the first surface to the second surface, a second protrusion first extension portion extended from the second fastening protrusion toward the discharge pipe, and a second protrusion second extension portion extended from the second fastening protrusion toward the inlet pipe; a first fastening hole including a first slit provided to pass through the discharge pipe to allow the first fastening protrusion to be inserted thereinto, and a first slit extension portion extended from the first slit to allow the first protrusion first extension portion to be inserted thereinto; and a second fastening hole including a second slit provided to pass through the discharge pipe to allow the second fastening protrusion to be inserted thereinto, and a second slit extension portion extended from the second slit to allow the second protrusion first extension portion to be inserted thereinto.

The first protrusion second extension portion and the second protrusion second extension portion may be provided to tightly adhere an inner circumferential surface of the discharge pipe to the first surface and the second surface by pressurizing the inner circumferential surface of the discharge pipe.

The laundry treating apparatus of the present disclosure may further comprise a first stopper protruded from the first surface; a second stopper protruded from the second surface; a discharge pipe first groove provided at a free end of the discharge pipe, in which the first stopper is accommodated; a discharge pipe second groove provided at the free end of the discharge pipe, in which the second stopper is accommodated; an inlet pipe first groove provided at a free end of the inlet pipe, in which the first stopper is accommodated; and an inlet pipe second groove provided at the free end of the inlet pipe, in which the second stopper is accommodated.

The laundry treating apparatus of the present disclosure may comprise a connector stopper provided in a ring shape protruded from the inner circumferential surface of the discharge pipe to be in contact with one end of the connector body, wherein the connector stopper may be provided to be upwardly inclined from the inner circumferential surface of the discharge pipe toward a corner of the through hole.

The laundry treating apparatus of the present disclosure may further comprise a sealing portion provided in a ring shape protruded from the inner circumferential surface of the discharge pipe toward the connector body, being in contact with an outer circumferential surface of the connector body.

According to the present disclosure, a laundry treating apparatus in which assembly of a detergent path for guiding a detergent to a tub is simple may be provided.

Also, a laundry treating apparatus that easily prevents water leakage of a detergent path from occurring may be provided.

Also, a laundry treating apparatus that minimizes discharge of water stored in a trap formed in a detergent path to a tub due to a pressure change inside the tub may be provided.

Also, a laundry treating apparatus that guides water, which moves from a trap to a tub due to a pressure change inside the tub, to an insulator for connecting a cabinet inlet with a tub inlet, may be provided.

It is to be understood that both the foregoing general description and the following detailed description of the present disclosure are exemplary and explanatory and are intended to provide further explanation of the disclosure as claimed.

BRIEF DESCRIPTION OF THE DRAWINGS

The accompanying drawings, which are included to provide a further understanding of the disclosure and are incorporated in and constitute a part of this application, illustrate embodiment(s) of the disclosure and together with the description serve to explain the principle of the disclosure. In the drawings.

DETAILED DESCRIPTION OF THE INVENTION

Reference will now be made in detail to the preferred embodiments of the present disclosure, examples of which are illustrated in the accompanying drawings. Meanwhile, elements or control method of apparatuses which will be described below are only intended to describe the embodiments of the present disclosure and are not intended to restrict the scope of the present disclosure. Wherever possible, the same reference numbers will be used throughout the drawings to refer to the same or like parts.

Figure 1:
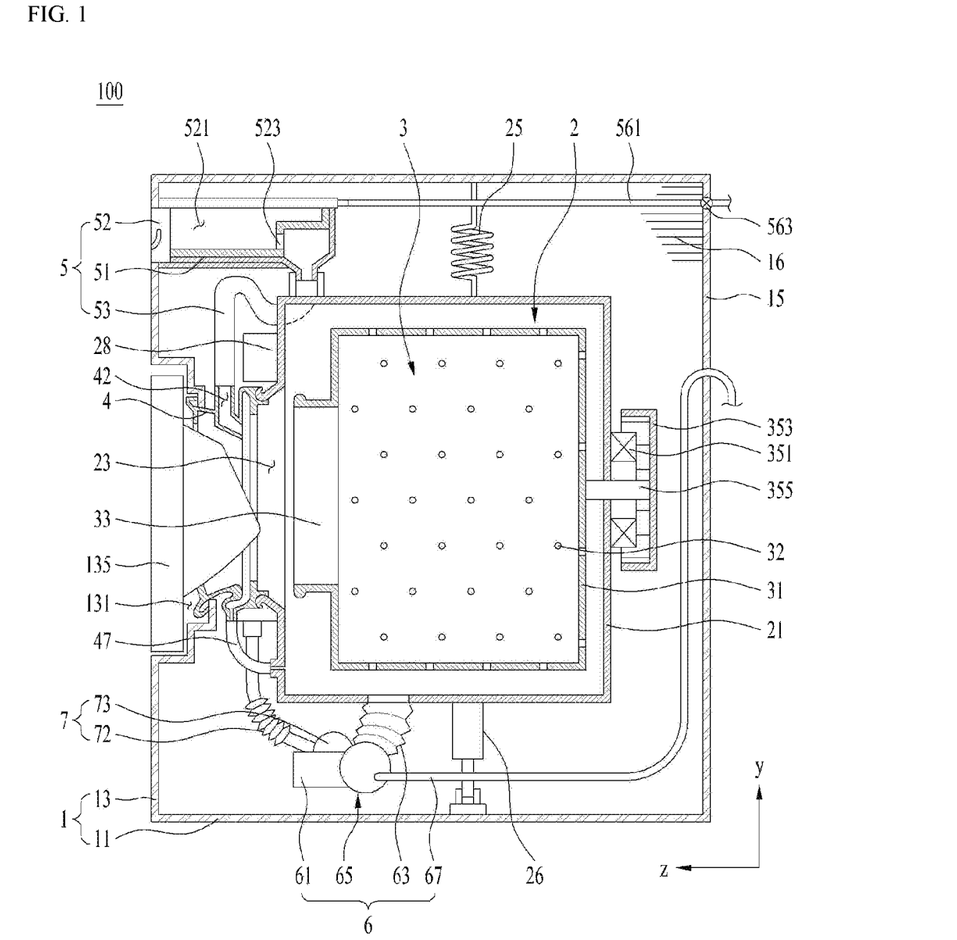
FIGS. 1 and 2 illustrate an example of a laundry treating apparatus according to the present disclosure.

A laundry treating apparatus 100 includes a cabinet 1, a tub 2 provided to store water inside the cabinet 1, a drum 3 rotatably provided inside the tub, storing laundry therein, and a detergent supply 5 supplying a detergent to the tub.

The cabinet 1 may be provided to include a base 11 forming a bottom surface of the laundry treating apparatus, a front panel 13 forming a front surface of the laundry treating apparatus, a rear panel 15 forming a rear surface of the laundry treating apparatus, a first side panel 16 and a second side panel (not shown) forming sides of the laundry treating apparatus, and an upper panel forming an upper surface of the laundry treating apparatus. The front panel 13 and the rear panel 15 may be fixed to the base 11, and the first side panel 16 and the second side panel may be fixed to the base 11 and provided to connect the front panel with the rear panel.

The front panel 13 is provided with an inlet 131 communicating the inside of the cabinet with the outside of the cabinet. The inlet 131 may be provided to be opened or closed by a door 135 rotatably provided in the front panel 13.

The tub 2 may be provided with a hollow tub body 21 of a cylindrical shape, and a tub inlet 23 is provided on a front surface of the tub body. The tub inlet 23 is connected to the inlet 131 through an insulator 4, and a detailed structure of the insulator will be described later.

Figure 2:
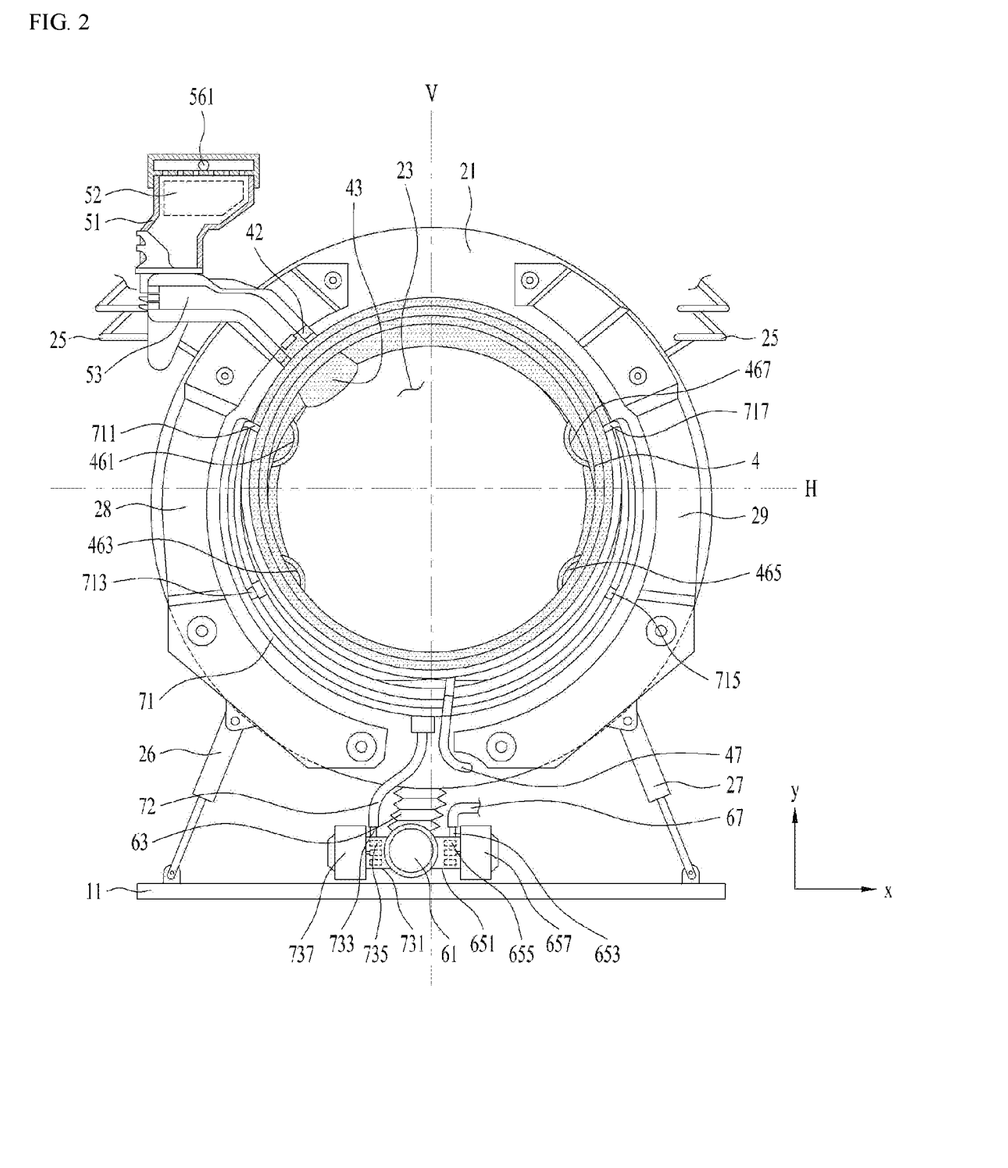

The tub body 21 may be fixed to the inside of the cabinet 1 through a tub support. As shown in FIG. 2, the tub support may be provided with a spring 25 fixing an area arranged above a horizontal line H passing through a rotation center of a drum on a circumferential surface of the tub body 21 to the cabinet 1, and a damper fixing an area arranged below the horizontal line H on the circumferential surface of the tub body 21 to the cabinet 1.

The damper may be provided to include a first damper 26 arranged at a left side of a vertical line V passing through the rotation center of the drum on the circumferential surface of the tub body 21, and a second damper 27 arranged at a right side of the vertical line V.

A front load portion increasing a weight of the tub body 21 may further be provided on the front surface of the tub body 21. The front load portion may be provided to include a first weight balancer 28 fixed to a space arranged at the left side of the vertical line V in the space provided by the front surface of the tub body, and a second weight balancer 29 fixed to the right side of the vertical line V in the space provided by the front surface of the tub body.

If the weight of the tub body 21 is increased through the front load portion, since the tub body 21 may absorb bigger vibration, vibration generated by rotation of the drum 3 may be delivered to the cabinet within a minimum range.

As shown in FIG. 1, the drum 3 includes a drum body 31 rotatably inside the tub body 21. The drum body 31 is provided in a hollow cylindrical shape, and a drum through hole 32 communicating the inside of the drum body with the inside of the tub body is provided on a circumferential surface, a front surface and a rear surface of the drum body 31. Also, a drum inlet 33 is provided on a surface (front surface of the drum) headed for the inlet 11 in the space provided by the drum body 31.

The drum body 31 is rotated by a drum driver, and the drum driver may be provided to include a stator 351 fixed to a rear surface of the tub body 21, generating a rotating field, a rotor 353 arranged outside the tub body 21 to be rotated by the rotating field, and a rotary shaft 355 provided to pass through the rear surface of the tub body 21, connecting the rotor 353 with the drum body 31.

The insulator 4 connecting the inlet 131 with the tub inlet 23 is a means for preventing water stored in the tub body 21 from being discharged to the cabinet 1 through the tub inlet 23 and attenuating vibration of the tub body 21, which is delivered to the cabinet 1.

Figure 3:
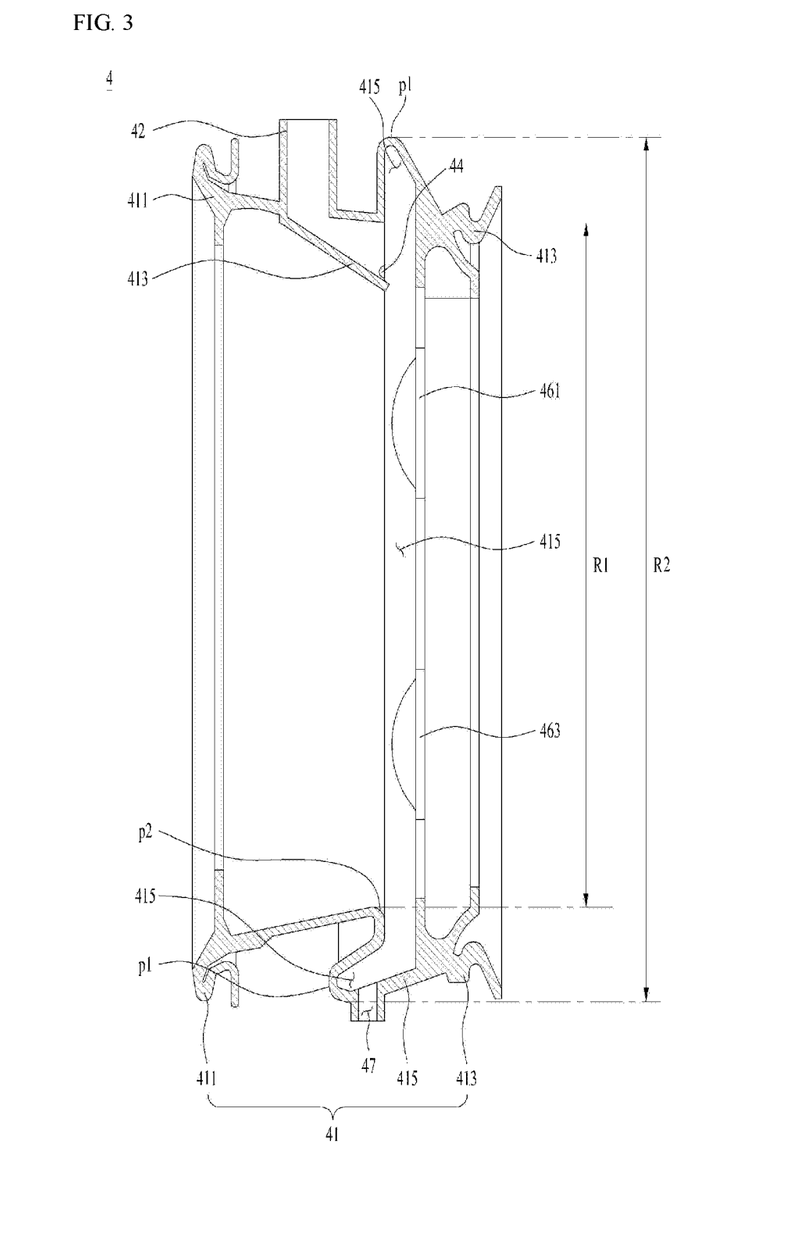
FIG. 3 illustrates an example of an insulator provided in a laundry treating apparatus according to the present disclosure.

As shown in FIG. 3, the insulator 4 is made of an elastic body (rubber, etc.), and is provided to include an insulating body 41 connecting the inlet 131 with the tub inlet 23. The insulating body 41 may be provided to include a first clamp 411 body of a cylindrical shape having one end fixed to the inlet 131, a second clamp body 413 of a cylindrical shape having the other end fixed to the tub inlet 23, and a connecting body 415 connecting a free end of the first clamp body with a free end of the second clamp body.

Preferably, the free end of the second clamp body has a diameter R2 set to be longer than a diameter R1 of the free end of the first clamp body, and the connecting body 415 connecting the two free ends with each other is provided to include at least one inflection point.

FIG. 3 illustrates that one inflection point P1 is provided on an upper space (space arranged above the horizontal line passing through the rotation center of the drum) of the connecting body, and two inflection points P1 and P2 are provided in a lower space of the connecting body. If one or more inflection points are provided in the connecting body 415, vibration of the tub body 21 may effectively be prevented from being delivered to the cabinet 1.

Considering that water entering the connecting body 415 is concentrated on the lower space of the connecting body, the number of inflection points formed in the lower space of the connecting body 415 is more than the number of inflection points arranged in the upper space of the connecting body 415. Since the water entering the connecting body 415 will be concentrated on the lower space of the connecting body by gravity, a volume of the lower space of the connecting body may be set to be greater than that of the upper space of the connecting body such that the remaining water may be removed preferably.

A communication pipe 47 communicating the inside of the connecting body 415 with the tub body 21 may further be provided in the insulator 4 such that the water entering the connecting body 415 may move to the tub body 21.

Preferably, one end of the communication pipe 47 is connected to the lowest point of the connecting body 415, the other end of the communication pipe 47 is fixed to the front surface of the tub body 21 such that it may be arranged to be lower than the lowest point of the connecting body 415. This is allow the water inside the connecting body 415 may be discharged out by gravity.

As shown in FIG. 1, the water stored in the tub body 21 is discharged to the outside of the cabinet 1 through a drainage 6.

The drainage 6 may be provided to include a chamber 61 providing a space where water is stored, a first drainage pipe 63 guiding water of the tub body 21 to the chamber 61, and a drainage pump 65 moving the water entering the chamber 61 to the second drainage pipe 67. The second drainage pipe 67 is a means for guiding the water discharged from the drainage pump 65 to the outside of the cabinet 1. The highest point of the second drainage pipe 67 may be provided to pass through a point higher than the lower end of the tub inlet 23 or a point higher than a second bending portion P2 provided in a lower area of the connecting body.

As shown in FIG. 2, the drainage pump may be provided to include a first housing 651 provided to be communicated with the chamber 61, providing a space where water is stored, a first impeller 655 rotatable inside the first housing, a first impeller motor 657 rotating the first impeller, and a first discharge output 653 provided to pass through a circumferential surface of the first housing to allow the second drainage pipe 67 to be fixed thereto.

In order to shorten a washing time and enhance a washing power, the laundry treating apparatus 100 of the present disclosure may further include a spray 7 spraying the water stored in the tub body 21 toward the drum inlet 33.

The spray 7 may include a path body 71 fixed to the front surface of the tub body and arranged between a circumferential surface of the insulating body 41 and a space between the front load portions 28 and 29, a supply pipe 72 guiding the water to the path body 71, and a circulating pump 73 moving the water inside the tub body 21 to the supply pipe 72.

The path body 71 may be provided in a fan shaped path provided along a space between the insulating body 41 and the first weight balancer 28 and a space between the insulating body 41 and the second weight balancer 29.

The circulating pump 73 may be provided to include a second housing 731 provided to be communicated with the chamber 61, providing a space where water is stored, a second impeller 735 provided inside the second housing, a second impeller motor 737 rotating the second impeller, and a second discharge output 733 provided to pass through a circumferential surface of the second housing to allow the supply pipe 72 to be fixed thereto.

The path body 71 may be provided with a first discharge outlet 711, a second discharge outlet 713, a third discharge outlet 715 and a fourth discharge outlet 717, through which water is discharged. The first discharge outlet 711 and the second discharge outlet 713 may be provided at the left side of the vertical line V passing through the center of the tub inlet 23, and the third discharge outlet 715 and the fourth discharge outlet 717 may be provided at the right side of the vertical line V.

The first discharge outlet 711 may be connected to a first spray guide 461 provided in the insulating body 41, the second discharge outlet 713 may be connected to a second spray guide 463 provided in the insulating body 41, the third discharge outlet 715 may be connected to a third spray guide 465 provided in the insulating body 41, and the fourth discharge outlet 717 may be connected to a fourth spray guide 467 provided in the insulating body 41.

The guides 461, 463, 465 and 467 are means for guiding the water respectively supplied from the discharge outlets 711, 713, 715 and 717 to a direction where the drum inlet 43 is arranged, and may be provided along a circumferential surface inside the second clamp body 413.

As shown in FIG. 1, the detergent supply 5 provided in the laundry treating apparatus may be provided to include a case 51 provided inside the cabinet 1, and a drawer 52 capable of being drawn out from the case 51.

The drawer 52 accommodated in the case 51 may be drawn out to the outside of the cabinet 1 through a drawer outlet provided to pass through the front panel 13. The drawer 52 may be provided in a polyhedron (hexahedron) of which upper surface is opened, and may include a storage 521 providing a space where a detergent is stored, and a detergent outlet 523 communicating the storage 521 with the case 51. The detergent outlet 523 may be provided as a through hole passing through a rear surface or a bottom surface of the storage 521, or may be provided as a bell trap provided on the bottom surface of the storage 521.

The case 51 is provided with a water supply for supplying water to the storage 521. FIG. 1 illustrates that the water supply is fixed to the upper surface of the case 51 as an example.

The water supply includes a water supply pipe 561 supplying water of a water supply source to the storage 521, and a water supply valve 563 opening or closing the water supply pipe 561 in accordance with a control signal of a controller (not shown). Therefore, if water is supplied to the storage 521 in which the detergent is stored through the water supply pipe 561, the detergent inside the storage 521 moves to the case 51 through the detergent outlet 523 together with the water.

The water and the detergent discharged to the case 51 may be supplied into the tub body 21 through the insulating body 41. To this end, the insulator 4 may be provided with an inlet pipe 42 through which the water and the detergent enters, and the detergent supply 5 may be provided with a discharge pipe 53 guiding the detergent and the water to the inlet pipe 42.

The inlet pipe 42 and the discharge pipe 53 may be provided with an elastic body (rubber, etc.). This is intended to minimize vibration of the tub, which is delivered to the case 51 and the front panel 15 through the inlet pipe 42 and the discharge pipe 53.

As shown in FIG. 3, the inlet pipe 42 may be provided as a pipe that passes through a circumferential surface of the insulating body 41. In this case, a guide 43 guiding the water supplied through the inlet pipe 42 to a direction where the drum inlet 33 is arranged may further be provided on the circumferential surface of the insulating body 41.

The inlet pipe 42 and the discharge pipe 53 are preferably provided to be formed in a single body to form one detergent path. However, when considering the structure of the insulator 4 and the structure of the discharge pipe 53, the inlet pipe 42 and the discharge pipe 53 will almost be impossible to be formed in a single path. As far as the inlet pipe 42 and the discharge pipe 53 are not easily formed in a single path, the laundry treating apparatus connects the inlet pipe 42 with the discharge pipe 53 through a connector 8.

When the inlet pipe 42 and the discharge pipe 53 are made of an elastic body such as rubber, the connector 8 is preferably made of a sintered body such as plastic. This is to minimize the possibility that the inlet pipe 42 and the discharge pipe 53 are detected from the connector 8 through a frictional force between rubber and plastic.

Figure 4:
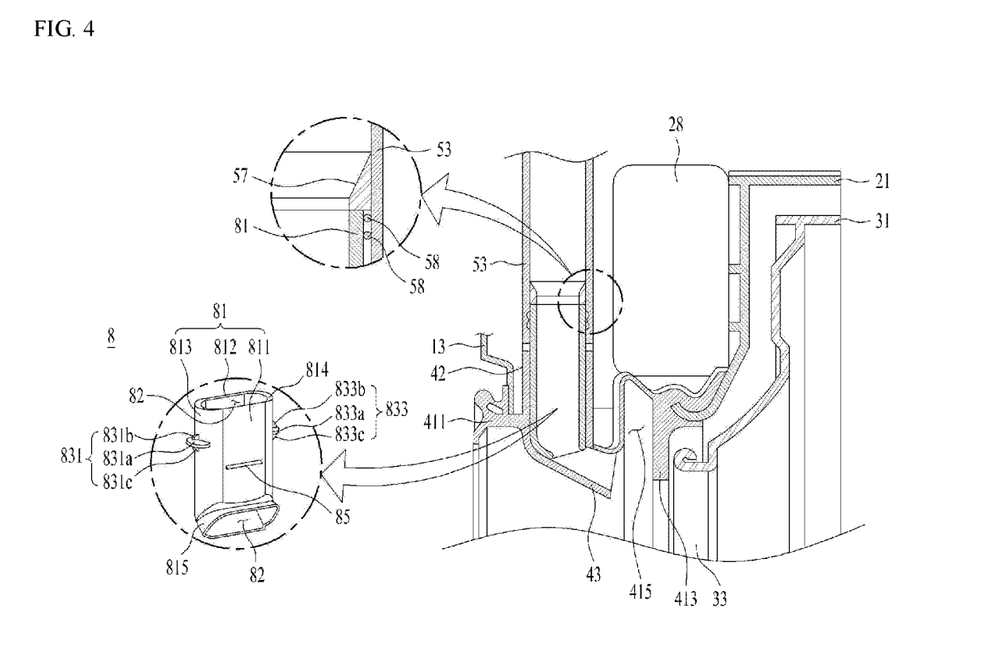
FIGS. 4, 5, 6A and 6B illustrate an example of a connector provided in a laundry treating apparatus of the present disclosure.

As shown in FIG. 4, the connector 8 may be provided to include a connector body 81 of a cylindrical shape having one end inserted into the discharge pipe 53 and the other end inserted into the inlet pipe 42, and a through hole 82 provided to pass through the connector body 81, guiding a fluid inside the discharge pipe 53 to the inlet pipe 42.

The connector body 81 may be provided in a shape that includes a first surface 811 and a second surface 812 arranged to face each other, a third surface 813 connecting one end of the first surface 811 with one end of the second surface 812, and a fourth surface 814 provided to connect the other end of the first surface 811 with the other end of the second surface 812. In this case, the third surface 813 and the fourth surface 814 may be provided to face each other.

The third surface 813 and the fourth surface 814 may be provided with curved surfaces having the same curvature radius. This is to minimize a damage of the discharge pipe or the inlet pipe due to a corner formed in the connector body and minimize the possibility that the connector body is detached from the discharge pipe or the inlet pipe by increasing a contact area (increasing a frictional force).

Among the four surfaces 811, 812, 813 and 814, two surfaces which are the longest should be set to be thicker than the other two surfaces which are the shortest, whereby thermal deformation due to injection molding may be minimized (detailed description will be given).

A bending portion 815 may be provided at one end of both ends of the connector body 81, which is arranged to be inserted into the inlet pipe 42. The bending portion 815 may be formed as a free end of the connector body 81 is bent toward the tub inlet 23, and an inclined angle of the bending portion 815 may be set to be equal to an inclined angle of the guide 43. In this case, the bending portion 815 may serve to guide the water inside the through hole 82 of the connector body to the guide 43 and prevent the connector body 81 from being detached from the insulating body 41.

The connector body 81 is fixed to the discharge pipe 53 through fastening portions 831 and 833, wherein the fastening portions may be provided with a first fastening portion 831 provided on the third surface 813 and a second fastening portion provided on the fourth surface 814.

The first fastening portion 831 may be provided to include a first fastening protrusion 831a protruded from the third surface 813, a first protrusion first extension portion 831b extended from the first fastening protrusion 831a toward the discharge pipe 53, and a first protrusion second extension portion 831c extended from the first fastening protrusion 831a toward the inlet pipe 42.

The first fastening protrusion 831a may be provided along a width direction (direction from the first surface toward the second surface) of the third surface, and the first protrusion first extension portion 831b and the first protrusion second extension portion 831c may be provided to be orthogonal to the fastening protrusion 831a.

The second fastening portion 833 may be provided to include a second fastening protrusion 833a protruded from the fourth surface 814, a second protrusion first extension portion 833b extended from the second fastening protrusion 833a toward the discharge pipe 53, and a second protrusion second extension portion 833c extended from the second fastening protrusion 833a toward the inlet pipe 42.

The second fastening protrusion 833a may be provided along a width direction (direction from the first surface toward the second surface) of the fourth surface, and the second protrusion first extension portion 833b and the second protrusion second extension portion 833c may be provided to be orthogonal to the fastening protrusion 833a.

Figure 5:
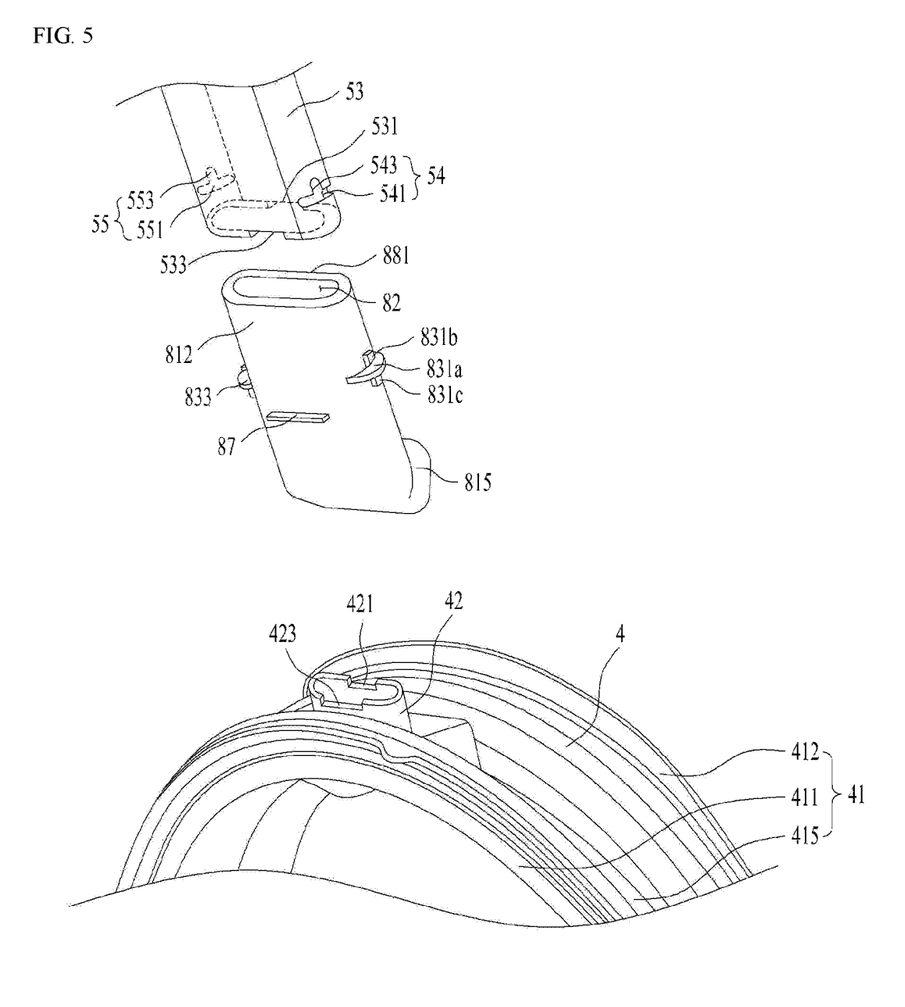

As shown in FIG. 5, the discharge pipe 53 is provided with a first fastening hole 54 to which the first fastening protrusion 831a is coupled, and a second fastening hole 55 to which the second fastening protrusion 833a is coupled.

The first fastening hole 54 may be provided to include a first slit 541 provided to pass through the discharge pipe 53 to allow the first fastening protrusion 831a to be inserted thereinto, and a first slit extension portion 543 extended from the first slit 541 to allow the first protrusion first extension portion 831b to be inserted thereinto. The second fastening hole 55 may be provided to include a second slit 551 provided to pass through the discharge pipe 53 to allow the second fastening protrusion 833a to be inserted thereinto, and a second slit extension portion 553 extended from the second slit 551 to allow the second protrusion first extension portion 833b to be inserted thereinto.

The first slit extension portion 543 is provided to be orthogonal to the first slit 541, and the second slit extension portion 553 is provided to be orthogonal to the second slit 551. Preferably, a front surface (surface toward the discharge pipe) of the first protrusion first extension portion 831b is provided to include an inclined surface downwardly inclined toward the first slit extension portion 543 on, and a front surface of the second protrusion first extension portion 833b is provided to include an inclined surface downwardly inclined toward the second slit extension portion 553. This is to allow the first protrusion first extension portion 831b and the second protrusion first extension portion 833b to be easily inserted into the first slit extension portion 543 and the second slit extension portion 553, respectively.

Meanwhile, it is preferable that a height of the first protrusion second extension portion 831c and a height of the second protrusion second extension portion 833c are set to be lengths that tightly adhere an inner circumferential surface of the discharge pipe 53 to the first surface 811 and the second surface 812 of the connector body by pressurizing the discharge pipe 53. This is to minimize a risk that water may be discharged to a space formed between the outer circumferential surface of the connector body 81 and the inner circumferential surface of the discharge pipe 53.

The connector body 81 may further be provided with position setting portions 85 and 87 that allows a worker to visually check a connection between the discharge pipe 53 and the inlet pipe 42 by allowing the worker to check a depth of the connector body 81 inserted into the discharge pipe 53 and a depth of the connector body 81 inserted into the inlet pipe 42.

The position setting portions may be provided as a first stopper 85 (see FIG. 4) protruded from the first surface 811 and a second stopper 87 (see FIG. 5) protruded from the second surface 812. The first stopper 85 may be provided as a bar provided along a width direction of the first surface 811, and the second stopper 87 may be provided as a bar provided along a width direction of the second surface 812.

In this case, a discharge pipe first groove 531 and a discharge pipe second groove 533, in which the first stopper 85 and the second stopper 87 are respectively accommodated, may be provided at the free end of the discharge pipe 53, and an inlet pipe first groove 421 and an inlet pipe second groove 423, in which the first stopper 85 and the second stopper 87 are respectively accommodated, may be provided at the free end of the inlet pipe 42.

Moreover, a connector stopper 57 provided in a ring shape to fix a position of the connector body 81 may further be provided on the inner circumferential surface of the discharge pipe 53.

As shown in FIG. 4, the connector stopper 57 may be provided to be upwardly inclined from the inner circumferential surface of the discharge pipe 53 toward a corner of the through hole 82. If the connector stopper 57 is provided to be upwardly inclined from the inner circumferential surface of the discharge pipe 53 toward a corner of the through hole 82, it is possible to minimize a risk of water leakage to the space between the discharge pipe and the connector body.

In order to minimize a risk of water leakage to the space between the discharge pipe 53 and the connector body 81, a sealing portion 58 may further be provided on the inner circumferential surface of the discharge pipe 53. As shown in FIG. 4, the sealing portion 58 may be provided as a ring shaped protrusion protruded from the inner circumferential surface of the discharge pipe toward the connector body.

Figure 6A:
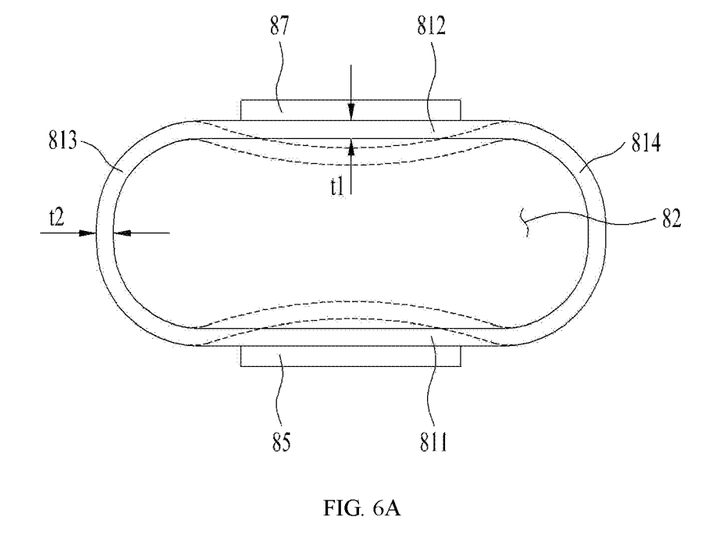

As shown in FIG. 6A, the first surface 811 and the second surface 812 may be set at the same length, and the third surface 813 and the fourth surface 814 may be set at the same length but may be set to be shorter than the first surface 811. In this case, if a thickness t1 of the first surface is equal to a thickness t2 of the third surface, the first surface 811 and the second surface 812 are likely to be bent toward the through hole 82 of the connector body.

As described above, if the connector body 81 is made of a sintered body such as plastic, the connector body 81 may be manufactured through injection molding for molding an object by solidifying a plastic resin injected into a mold. Even though the first surface and the second surface are set to be longer than the third surface or the fourth surface when the connector body 81 is manufactured through injection molding, if the thickness t1 of the first surface is equal to the thickness t2 of the third surface, a solidified speed of the third surface 813 and the fourth surface 814 is different from that of the first surface 811 and the second surface 812, whereby the first surface 811 and the second surface 812 are likely to be bent toward the through hole 82.

If the first surface 811 and the second surface 812 are bent toward the through hole 82, the space is formed between the discharge pipe 53 and the connector body 81, whereby there may be the risk of leaking water moving inside the discharge pipe 53 out toward the cabinet 1. In order to solve this problem, it is preferable that the thickness t1 of the first surface is set to be thicker than the thickness t2 of the third surface.

Figure 6B:
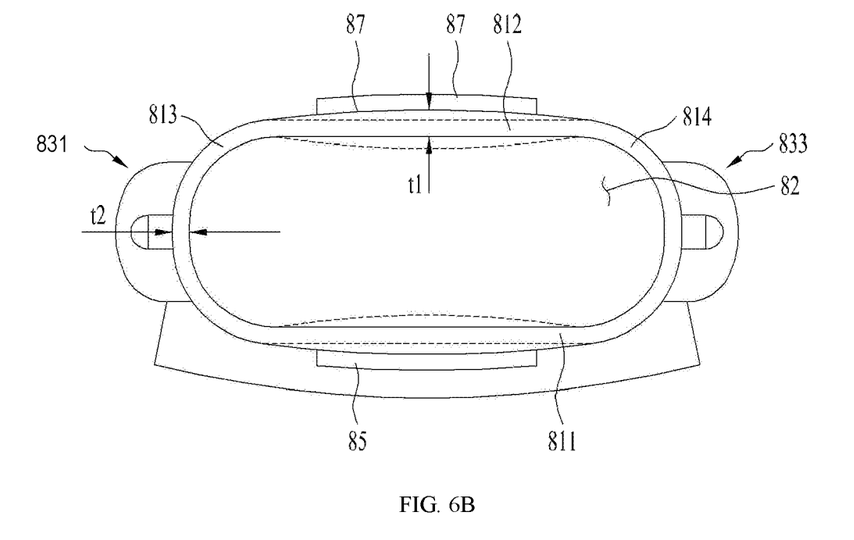

That is, as shown in FIG. 6B, a section in a thickness direction of the first surface 811 may be provided in a convex shape toward a direction far away from the center of the through hole 82, and a section in a thickness direction of the second surface 812 may be provided in a convex shape toward a direction far away from the center of the through hole 82.

If the first surface 811 and the second surface 812 are provided in the same shown in FIG. 6B, even though deformation (dotted line in FIG. 6B) occurs in the first surface 811 and the second surface 812 during injection molding, it is possible to minimize the possibility of water leakage to the space between the discharge pipe 53 and the first surface 811 and the space between the discharge pipe 53 and the second surface 812.

Unlike FIG. 6B, if the first surface 811 and the second surface 812 are set at the same length, and the third surface 813 and the fourth surface 814 are set at the same length but are longer than the first surface 811, the thickness t2 of the third surface should be set to be thicker than the thickness t1 of the first surface to expect the aforementioned effect. In this case, a section in a thickness direction of the third surface 813 may be provided in a convex shape toward a direction far away from the center of the through hole 82, and a section in a thickness direction of the fourth surface 814 may be provided in a convex shape toward a direction far away from the center of the through hole 82.

In accordance with the aforementioned connector 8, the laundry treating apparatus may facilitate assembly of the discharge pipe 53 and the inlet pipe 42 and effectively prevent water leakage from occurring.

Figure 7A:
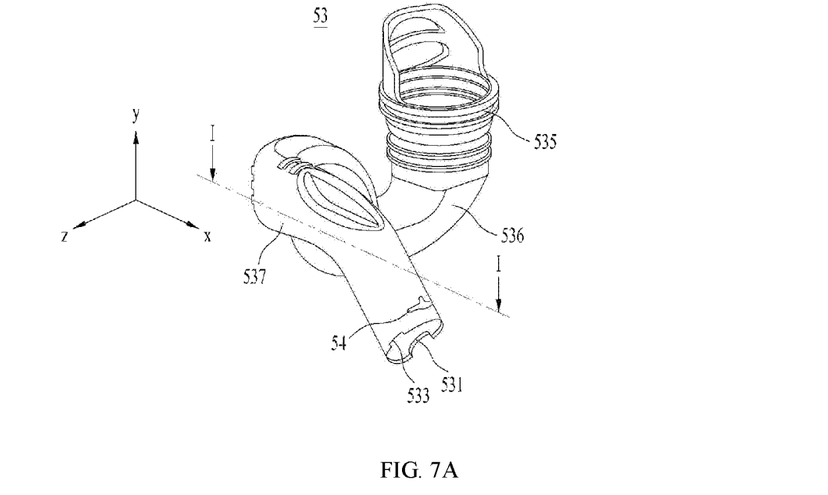
FIGS. 7A and 7B illustrate an example of a discharge pipe provided in a laundry treating apparatus of the present disclosure.
Figure 7B:
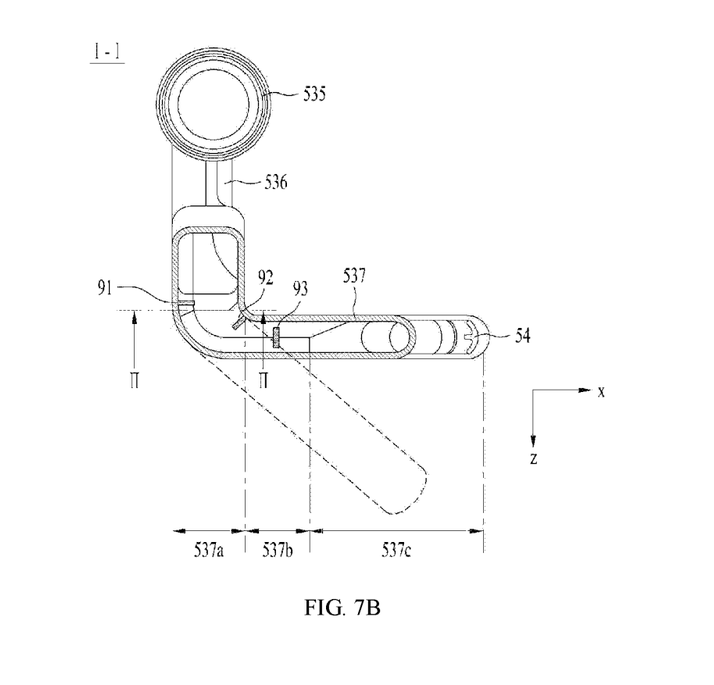

FIGS. 7A and 7B illustrate an example of the discharge pipe 53. The discharge pipe 53 of FIGS. 7A and 7B may be provided with a storage connecting pipe 535 fixed to the case 51, an insulator connecting pipe 537 connected to the inlet pipe 42 of the insulator through the connector 8, and a trap forming pipe 536 forming a water trap between the storage connecting pipe and the insulator connecting pipe. The detergent discharged from the storage 521 enters the discharge pipe 53 through the storage connecting pipe 535.

The trap forming pipe 536 may be provided to form any one of a P-trap, a U-trap, and an S-trap. The laundry treating apparatus 100 may block communication between the inner space of the tub body 21 and the inner space of the case 51 through the trap forming pipe 536. As a result, the laundry treating apparatus may block movement of bubbles inside the tub body to the case 15 through the discharge pipe 53. Moreover, if the laundry treating apparatus is exclusively used as a drying machine, the trap forming pipe 536 may be a means for preventing the heated air supplied to the tub body from leaking outside the tub body through the discharge pipe 53.

The water stored in the trap forming pipe 536 may be discharged to the insulating body 41 in accordance with a pressure change inside the tub body 21, which is generated when a user opens the door 135. If the door 135 opens the inlet 131, a pressure inside the tub body 21 is temporarily lowered, whereby the water of the trap forming pipe 536 may move to the inlet pipe 42.

The water stored in the trap forming pipe 536 is water remaining in the discharge pipe 53 after completion of a water supply procedure or a detergent supply procedure or a mixture of water and detergent, and therefore causes a problem related to sanitary but may allow a user who uses the laundry treating apparatus to misunderstand a damage of the detergent supply.

In order to minimize such a problem, the discharge pipe 53 is further provided with a speed reducer for reducing a flow rate of water moving from the trap forming pipe 536 to the insulator connecting pipe 537.

If a speed of the water moving from the trap forming pipe 536 to the inlet pipe 42 is lowered by the speed reducer, the water will move to the connecting body 415 provided in the insulating body along the surface of the insulator 4. If the water moves to the connecting body 415 along the surface of the insulator 4, since the user fails to recognize that the water is discharged from the trap forming pipe 536, the user's misunderstanding such as a damage of the detergent supply may be avoided.

As shown in FIG. 7B, the trap forming pipe 536 and the insulator connecting pipe 537 are preferably provided to form an angle of 90° or more and 120° or less on a plane (X-Z plane) parallel with a bottom surface 11 (base) of the cabinet.

If the trap forming pipe 536 projected on the bottom surface of the cabinet 1 and the insulator connecting pipe 536 projected on the bottom surface of the cabinet are provided to an angle of 90° or more and 120° or less, an inflection point (path inflection point) will be formed in a path for connecting the trap forming pipe 527 with the inlet pipe 42, wherein the path inflection point may reduce a flow rate of the water moving from the trap forming pipe 536 toward the inlet pipe 42.

A reduction effect of a flow rate is the greatest when the trap forming pipe 536 and the insulator connecting pipe 537 are provided to be orthogonal to each other. In this case, the insulator connecting pipe 537 will be provided to be parallel with a width direction (X-axis direction) of the front panel 13 of the cabinet, and the trap forming pipe 536 will be provided to be parallel with a width direction (Z-axis direction) of the first side panel 16 of the cabinet.

As shown in FIG. 7B, the insulator connecting pipe 537 may be provided to include a curved portion 537a connected to the trap forming pipe 536, a horizontal portion 537b extended along the width direction (X-axis direction) of the front panel 13, and an inclined portion 537c connecting the horizontal portion 537b with the inlet pipe 42.

The curved portion 537a may be provided to be arranged at a corner where the front panel 13 and the first side panel 16 are coupled with each other, and the inclined portion 537c may be provided to be inclined from one end of the horizontal portion 537*b* toward the bottom surface 11 of the cabinet. In this case, the speed reducer may be provided to include a first speed reducing wall 91 and a second speed reducing wall 92, which are provided inside the curved portion 537*a* to form a zigzag path.

As shown in FIG. 7B, the first speed reducing wall 91 may be provided on a curved surface having a larger curvature radius, among curved surfaces formed by the curved portion 537*a*, along a height direction (Y-axis direction) of the cabinet, and the second speed reducing wall 92 may be provided on a curved surface having a smaller curvature radius, among the curved surfaces formed by the curved portion 537*a*, along the height direction (Y-axis direction) of the cabinet.

Unlike FIG. 7B, the first speed reducing wall 91 may be provided on the curved surface having a smaller curvature radius, among the curved surfaces formed by the curved portion 537*a*, along the height direction of the cabinet, and the second speed reducing wall 92 may be provided on the curved surface having a larger curvature radius, among the curved surfaces formed by the curved portion 537*a*, along the height direction of the cabinet.

However, if the first speed reducing wall 91 and the second speed reducing wall 92 are sequentially provided in the trap forming pipe 536 toward the horizontal portion 537*b*, since the amount of water moving along the curved surface having a larger curvature radius among the curved surfaces formed by the curved portion 537*a* is more than the amount of water moving along the curved surface having a smaller curvature radius, the first speed reducing wall 91 and the second speed reducing wall 92 are preferably arranged as shown in FIG. 7B.

The speed reducer provided in the laundry treating apparatus may further include at least any one of a third speed reducing wall 93 protruded from the bottom surface of the horizontal portion 537*b* toward the height direction (Y-axis direction) of the cabinet, and a fourth speed reducing wall (not shown) protruded from the bottom surface of the inclined portion 537*c* toward the height direction of the cabinet.

A main function of the first speed reducing wall 91 and the second speed reducing wall 92 is to return the water discharged from the trap forming pipe 536 to the trap forming pipe, while a main function of the third speed reducing wall 93 and the fourth speed reducing wall (not shown) is to reduce the flow rate.

The third speed reducing wall 93 and the fourth speed reducing wall are provided to be protruded from the bottom surface of the horizontal portion 537*b* and the bottom surface of the inclined portion 537*c*. This is because that the speed of the water is lowered by passing through the first speed reducing wall 91 and the second speed reducing wall 92 and thus the wall provided on the bottom surface of the horizontal portion 537*b* or the bottom surface of the inclined portion 537*c* will be more effective for reduction of the flow rate than the side of the horizontal portion 537*b* or the side of the inclined portion 537*c*.

Figure 8A:
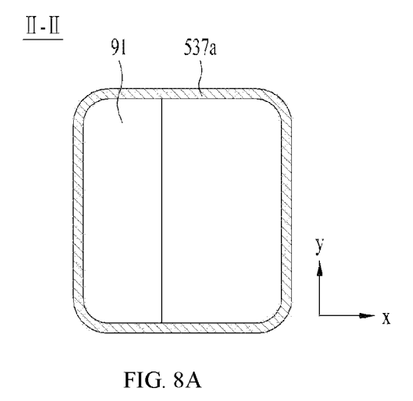
FIGS. 8A to 8D illustrate an example of a reduction wall provided in a discharge pip.

FIGS. 8A to 8D illustrate a shape of the first speed reducing wall 91. As shown in FIG. 8A, the first speed reducing wall 91 may be provided as a wall extended from the bottom surface of the curved portion 537*a* toward the upper surface of the curved portion 537*a*. However, the first speed reducing wall 91 of the shape shown in FIG. 8A is likely to be damaged during molding of the discharge pipe 53. That is, in order to form the first speed reducing wall of the shape shown in FIG. 8A, a second mold forming the first speed reducing wall 91 is inserted into a first mold forming a circumferential surface of the curved portion 537*a*, a material is injected between the two molds, and the second mold should be extracted from the first mold after the material is solidified. However, if the second mold is extracted from the first mold in a state that the first speed reducing wall is formed, the first speed reducing wall 91 may be torn by the second mold.

Figure 8B:
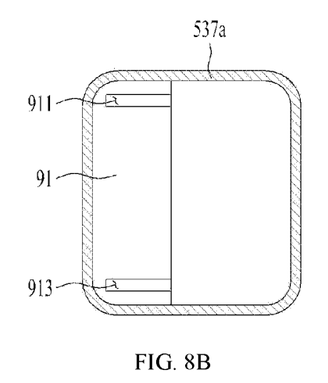

In order to solve the problem, cutting portions 911 and 913 provided along a width direction (X-axis direction) of the first speed reducing wall 91 may further be provided at an upper end or a lower end of the first speed reducing wall 91. FIG. 8B illustrates that the upper cutting portion 911 is provided on an upper area of the first speed reducing wall 91 and a lower cutting portion 913 are provided on a lower area of the first speed reducing wall 91, as an example.

Figure 8C:
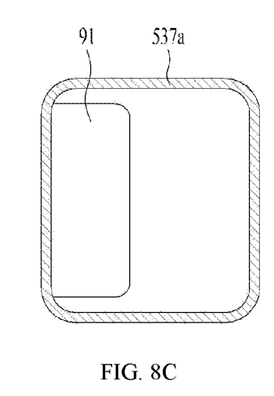

As shown in FIG. 8C, the upper end of the first speed reducing wall 91 may be provided to be spaced apart from the upper surface of the curved portion 537*a*, and the lower end of the first speed reducing wall 91 may be provided to be spaced apart from the lower surface of the curved portion 537*a*.

The first speed reducing wall 91 having the structure of FIG. 8B or FIG. 8C may be rotated or deformed toward a direction where the second mold is extracted when the second mold is extracted from the first mold, whereby the problem that the first speed reducing wall is damaged when the mold is removed may be solved.

Figure 8D:
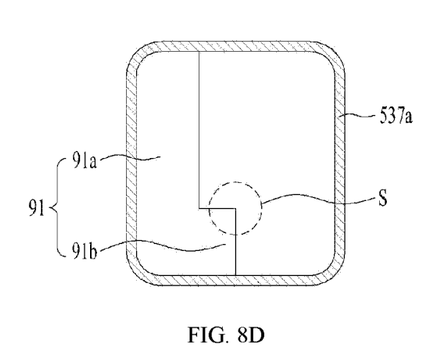

Moreover, the first speed reducing wall 91 may be provided in the shape shown in FIG. 8D. That is, a step difference S formed along a height direction (Y-axis direction) of the curved portion may be provided at a free end of the first speed reducing wall 91. In this case, the first speed reducing wall 91 may be provided with an upper wall 91*a* connected from the upper surface of the curved portion 537*a* and a lower wall 91*b* fixed to the bottom surface of the curved portion 537*a*, having a width different from that of the upper wall. Although the description of FIGS. 8A to 8D is based on the first speed reducing wall 91, the structure shown in FIGS. 8A to 8D is preferably applied to the second speed reducing wall 92.

Moreover, the structure of FIGS. 8A to 8D may be applied to the third speed reducing wall 93 and the fourth speed reducing wall. That is, both ends of a width direction (Z-axis direction) of the third speed reducing wall 93 may be provided so as not to be fixed to both sides of the horizontal portion 537*b*, and both ends of a width direction (Z-axis direction) of the fourth speed reducing wall may be provided to be spaced apart from both ends of the inclined portion 537*c*.

In order to minimize exposure of the water stored in the trap forming pipe 536 and discharged to the tub body, the laundry treating apparatus 100 may further include a connecting path 44 (see FIG. 3) for guiding the water flowing along the guide 43 of the insulating body, to the connecting body 415.

Figure 9:
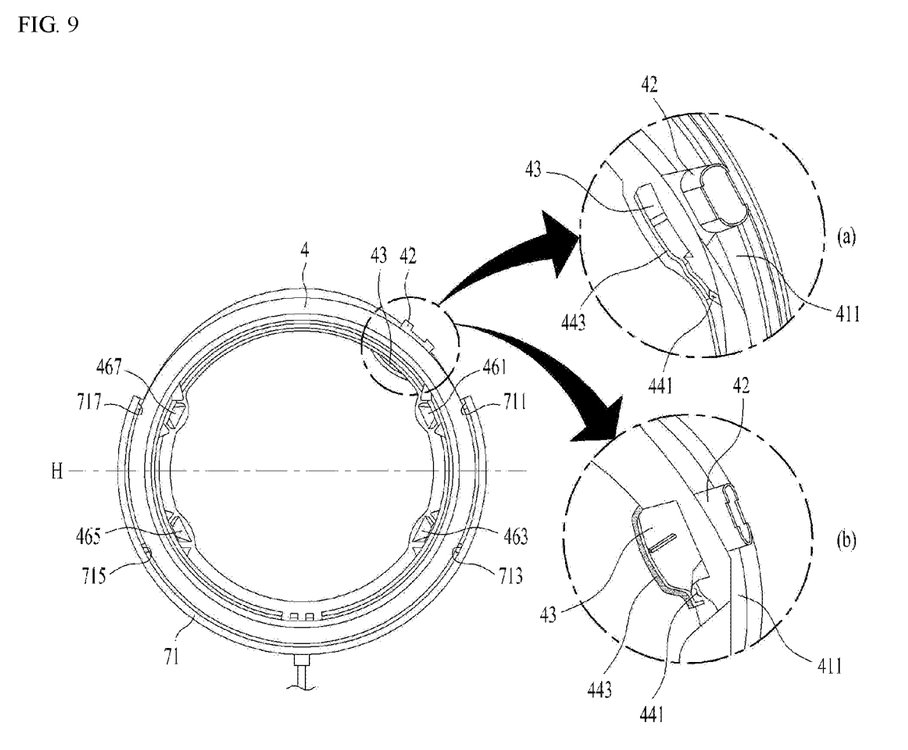
FIG. 9 illustrates an example of a connection path for guiding water discharged from a trap forming pipe to a connection body.

FIG. 9 illustrates a rear surface of the insulator 4. As shown in FIG. 9, the connecting path 44 may be provided as a groove 441 connecting the inner space of the guide 43 with the connecting body 415.

The guide 43 is provided in a space arranged above the horizontal line H passing through the rotation center of the drum in the space provided by the first clamp body 411. Therefore, a liquid moving along the guide 43 at a speed less than a reference speed (speed of a liquid separated from a surface of the guide) will move toward a corner of the guide 43 and then be supplied to the connecting body 415 through the groove 441. The liquid supplied to the connecting body 415 moves to the tub body 21 through the communication pipe 47 arranged in the lower space of the connecting body. Therefore, the laundry treating apparatus may minimize visual checking of the water, which is discharged from the trap forming pipe 536, through the aforementioned groove 441.

The connecting path 44 provided in the laundry treating apparatus may further include a groove guide 443 provided at the corner of the guide 43, guiding the liquid inside the guide 43 to the groove 441.

As shown in FIG. 9A, the groove guide 443 may be provided along the corner of the guide 43, and may be provided as a wall protruded from the corner of the guide 43 toward the first clamp body 441. Unlike this case, the groove guide 443 may be provided along the corner of the guide 43, and may be provided as a wall protruded from the corner of the guide 43 toward the direction where the tub inlet 23 is arranged (see FIG. 9B).

It will be apparent to those skilled in the art that the present disclosure may be embodied in other specific forms without departing from the spirit and essential characteristics of the disclosure. Thus, the above embodiments are to be considered in all respects as illustrative and not restrictive. The scope of the disclosure should be determined by reasonable interpretation of the appended claims and all change which comes within the equivalent scope of the disclosure are included in the scope of the disclosure.

What is claimed is:

1. A laundry treating apparatus comprising:
    a cabinet that defines an inlet;
    a tub that defines a space configured to receive water, the tub having a tub inlet that faces the inlet of the cabinet;
    a drum rotatably disposed inside the tub and configured to receive laundry therein, the drum having a drum inlet that faces the tub inlet;
    a storage disposed inside the cabinet and configured to receive detergent;
    a discharge pipe configured to discharge the detergent to an outside of the storage, the discharge pipe being made of a first elastic material;
    an insulating body that connects the inlet of the cabinet with the tub inlet;
    an inlet pipe that is made of a second elastic material and that passes through a circumferential surface of the insulating body; and
    a connector that connects the discharge pipe with the inlet pipe and that is made of a material different from each of the first elastic material and the second elastic material, the connector having a first end inserted into the discharge pipe and a second end inserted into the inlet pipe,
    wherein the connector comprises a connector body that has a cylindrical shape, and defines a through hole passing through the connector body, the connector body having the first end inserted into the discharge pipe and the second end inserted into the inlet pipe,
    wherein the connector body comprises:
        a first surface and a second surface that face each other,
        a third surface that connects one end of the first surface to one end of the second surface, and
        a fourth surface that connects another end of the first surface to another end of the second surface, the fourth surface facing the third surface,
    wherein a first pair of surfaces among the first to fourth surfaces have a first cross sectional length, and a second pair of surfaces among the first to fourth surfaces have a second cross sectional length that is less than the first cross sectional length, and
    wherein a thickness of each of the first pair of surfaces is greater than a thickness of each of the second pair of surfaces.

2. The laundry treating apparatus of claim 1, wherein each of the first surface and the second surface has the first cross sectional length,
    wherein each of the third surface and the fourth surface has the second cross sectional length, and
    wherein the thickness of the first surface is greater than the thickness of the third surface.

3. The laundry treating apparatus of claim 2, wherein the first surface is convex in a first direction outward from the through hole, and the second surface is convex in a second direction outward from the through hole.

4. The laundry treating apparatus of claim 3, wherein outer sides of the first surface and the second surface are convex outward from the through hole, and
    wherein inner sides of the first surface and the second surface are flat and face the through hole.

5. The laundry treating apparatus of claim 1, wherein each of the first surface and the second surface has the second cross sectional length,
    wherein each of the third surface and the fourth surface has the first cross sectional length, and
    wherein the thickness of the third surface is greater than the thickness of the first surface.

6. The laundry treating apparatus of claim 5, wherein the third surface is convex in a first direction outward from the through hole and the fourth surface is convex in a second direction outward from the through hole.

7. The laundry treating apparatus of claim 1, wherein a cross section of the connector body has an elongated circular shape, and
    wherein a cross sectional thickness of the connector body varies along a perimeter of the connector body.

8. The laundry treating apparatus of claim 7, wherein the cross section of the connector body comprises a first portion having a first sectional length and a second portion having a second sectional length that is shorter than the first sectional length, and
    wherein the cross sectional thickness of the first portion is greater than the cross sectional thickness of the second portion.

9. The laundry treating apparatus of claim 8, wherein a radius of curvature of the first portion is greater than a radius of curvature of the second portion.

10. The laundry treating apparatus of claim 1, wherein the connector further comprises:
    a first fastening portion comprising:
        a first fastening protrusion that is disposed on the third surface,
        a first protrusion first extension portion that extends from the first fastening protrusion toward the discharge pipe, and
        a first protrusion second extension portion that extends from the first fastening protrusion toward the inlet pipe; and
    a second fastening portion comprising:
        a second fastening protrusion that is disposed on the fourth surface,
        a second protrusion first extension portion that extends from the second fastening protrusion toward the discharge pipe, and a second protrusion second extension portion that extends from the second fastening protrusion toward the inlet pipe, and wherein the discharge pipe defines a first fastening hole that receives the first fastening portion and a second fastening hole that receives the second fastening portion.

11. The laundry treating apparatus of claim 10, wherein the first fastening protrusion and the second fastening protrusion extend along a circumferential direction of the connector body.

12. The laundry treating apparatus of claim 10, wherein the first fastening hole comprises:
   a first slit that is recessed from an inner surface of the discharge pipe and that receives the first fastening protrusion, and
   a first slit extension portion that extends from the first slit and that receives the first protrusion first extension portion, and
   wherein the second fastening hole comprises:
      a second slit that is recessed from the inner surface of the discharge pipe and that receives the second fastening protrusion, and
      a second slit extension portion that extends from the second slit and that receives the second protrusion first extension portion.

13. The laundry treating apparatus of claim 12, wherein the first protrusion first extension portion and the second protrusion first extension portion protrude toward an inner circumferential surface of the discharge pipe and are configured to provide pressure to the inner circumferential surface of the discharge pipe to thereby attach the first surface and the second surface of the connector body to the inner circumferential surface of the discharge pipe.

14. The laundry treating apparatus of claim 12, wherein the connector further comprises:
   a first stopper that protrudes from the first surface; and
   a second stopper that protrudes from the second surface, and
   wherein the discharge pipe has:
      a discharge pipe first groove defined at an end of the discharge pipe, the discharge pipe first groove accommodating a part of the first stopper, and
      a discharge pipe second groove defined at the end of the discharge pipe, the discharge pipe second groove accommodating a part of the second stopper, and
   wherein the inlet pipe has:
      an inlet pipe first groove defined at an end of the inlet pipe, the inlet pipe first groove accommodating another part of the first stopper; and
      an inlet pipe second groove defined at the end of the inlet pipe, the inlet pipe second groove accommodating another part of the second stopper.

15. The laundry treating apparatus of claim 14, further comprising:
   a connector stopper that has a ring shape, that protrudes from an inner circumferential surface of the discharge pipe, and that is configured to contact one end of the connector body,
   wherein the connector stopper comprises an inclined surface that slopes with respect to the inner circumferential surface of the discharge pipe and that extends toward a corner of the through hole.

16. The laundry treating apparatus of claim 15, wherein the inclined surface defines an inner diameter of the connector stopper, the inner diameter decreasing as the inclined surface extends toward an upper end of the connector.

17. The laundry treating apparatus of claim 15, further comprising:
   a sealing portion that has a ring shape, that protrudes from the inner circumferential surface of the discharge pipe toward the connector body, and that is configured to contact an outer circumferential surface of the connector body.

18. The laundry treating apparatus of claim 10, wherein the connector further comprises a bending portion that is disposed at an end of the connector body, that is curved from the end of the connector body, and that is inserted into the inlet pipe, and
   wherein the through hole passes through from the connector body and the bending portion.

19. The laundry treating apparatus of claim 1, wherein the discharge pipe and the inlet pipe are made of rubber, and the connector is made of plastic.

* * * * *